US007158391B2

(12) United States Patent
Hatakeyama

(10) Patent No.: US 7,158,391 B2
(45) Date of Patent: Jan. 2, 2007

(54) SWITCHING POWER SUPPLY UNIT

(75) Inventor: Haruhiko Hatakeyama, Nihonbashi (JP)

(73) Assignee: TDK Corporation (JP)

( * ) Notice: Subject to any disclaimer, the term of this patent is extended or adjusted under 35 U.S.C. 154(b) by 0 days.

(21) Appl. No.: 11/272,891

(22) Filed: Nov. 14, 2005

(65) Prior Publication Data

US 2006/0114698 A1 Jun. 1, 2006

(30) Foreign Application Priority Data

Nov. 26, 2004 (JP) ............................ 2004-342516

(51) Int. Cl.
*H02M 3/335* (2006.01)

(52) U.S. Cl. ..................................... 363/21.01; 363/97

(58) Field of Classification Search ................. 363/20, 363/21.01, 21.12, 21.13, 21.16, 95, 97, 131
See application file for complete search history.

(56) References Cited

U.S. PATENT DOCUMENTS 5,420,777 A * 5/1995 Muto ..................... 363/21.17
5,903,452 A * 5/1999 Yang .......................... 363/97
6,134,123 A * 10/2000 Yamada .................. 363/21.13
6,631,082 B1 * 10/2003 Birumachi ................... 363/97
6,768,655 B1 * 7/2004 Yang et al. ............. 363/21.01
7,006,365 B1 * 2/2006 Kitano ................... 363/56.03

FOREIGN PATENT DOCUMENTS

JP 5-236743 9/1993
JP 5-80185 10/1993

* cited by examiner

*Primary Examiner*—Adolf Berhane
(74) *Attorney, Agent, or Firm*—McGlew & Tuttle, PC

(57) ABSTRACT

A first side circuit connected to a primary coil of a transformer includes a main switching element driving the primary coil, and a control circuit which detects an output voltage to feedback and drives and controls the main switching element so as to keep constant the output voltage by acquiring a voltage induced in a tertiary coil of the transformer. A secondary side circuit of the transformer includes a dummy load circuit connected to the output terminal, a detection circuit which detects a secondary coil voltage of the transformer, and a dummy load control circuit which is controlled by the detection circuit and controls so as to flow current flow through the dummy load circuit only in a state of a light load.

4 Claims, 7 Drawing Sheets

INPUT TERMINAL
+Vin
-Vin
V1
C11
FIRST SIDE CIRCUIT
R11
1
CONTROL CIRCUIT
Qm
N1
N3
TR
SECOND SIDE CIRCUIT
N2
V2
R1
R2
C1
2
Q1
D1
C2
R3
5
D2
R4
Q2
4
R5
Q3
3
R6
D3
Io
C3
OUTPUT TERMINAL
+Vout
-Vout

FIG. 3A
TRANSFORMER SECOND-COIL VOLTAGE WAVEFORM
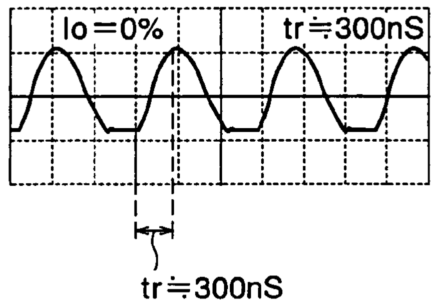
FIG. 3D
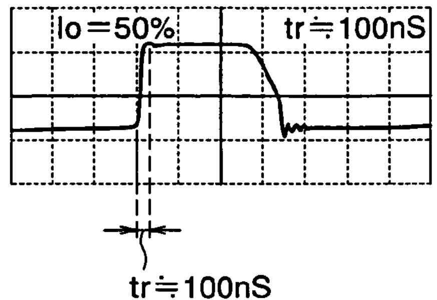
FIG. 3B
Q1 Vgs VOLTAGE WAVEFORM
Io=0%
Vth
FIG. 3E
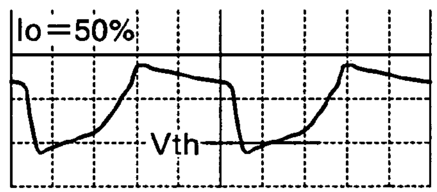
FIG. 3C
Q2 Vgs VOLTAGE WAVEFORM
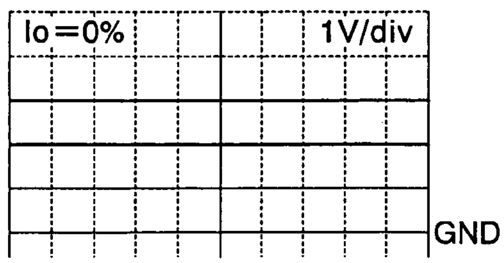
FIG. 3F
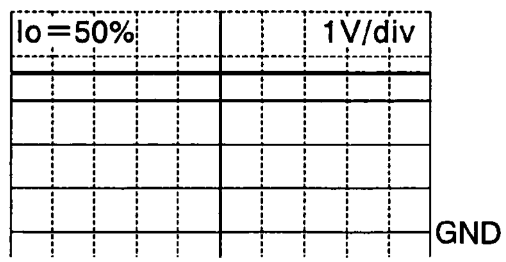

WITHOUT DUMMY LOAD RESISTOR, Io = 0%, INTERMITTENT OSCILLATION

WITH DUMMY LOAD RESISTOR, Io = 0%, ORDINARY STATE

AC INPUT
OUTPUT
1
2
3
10
11
12
13
20
30
31
32
40
50
51
52
100
C0
C1
C21
C22
CL11
CL12
CL2
D1
D2
V1
V2
Vc
Vf
ZD
R1
R2

SWITCHING POWER SUPPLY UNIT

BACKGROUND OF THE INVENTION

1. Field of the Invention

This invention relates to a switching power supply unit, and more particularly to a switching power supply unit using RCC (Ringing Choke Converter) and a switching power supply unit such as a PWM control type fly-back converter or a forward converter.

2. Description of the Related Art

Firstly, a patent document 1 (Japanese Patent Application Laid-Open No. 5-236743) is described below as a conventional example 1. This conventional example 1 relates to a switching power supply unit which stabilizes voltage control even against a wide range of load variation.

FIG. 6 shows an exemplary circuit of the switching power supply unit. This switching power supply unit employs the RCC as its basic structure, and is provided with a light load stabilization circuit 50. The light load stabilization circuit 50 automatically detects whether or not a load 100 is large (or small) to separate (or connect) a dummy load 40.

In the secondary DC power supply 30 side, there is provided the light load stabilization circuit 50, which comprises a switch circuit (transistor) 51 connected in series to the dummy load 40 and a voltage detection circuit 52. The voltage detection circuit 52 comprises a zener diode ZD and voltage dividing resistors R1 and R2, and turns on the transistor (51) when the detected voltage exceeds a set voltage, and otherwise turns off the transistor (51).

In this structure, the dummy load 40 is separated from the secondary DC power supply 30 when the load 100 is large. Accordingly, firstly a large value of the dummy load 40 can be selected without taking into account the increase of power consumption and the reduction of power efficiency at the time of a maximum load. Secondly, a small value of the dummy load 40 can also be selected in a range in which the control can be stabilized even against a minimum-side variation of the load 100. Specifically, the size of a pulse transformer 20 can be reduced by maximizing the oscillation frequency. Thus, the value of the dummy load 40 can appropriately be selected in view of the conditions described above.

In this switching power supply unit using RCC, when the load 100 is large, the light load stabilization circuit 50 separates the dummy load 40 from the secondary DC power supply 30. On the other hand, when the load 100 becomes small (a state of light load), the oscillation frequency becomes high, so that the control becomes unstable and secondary DC power supply voltage V2 becomes high. Therefore, when the detected voltage exceeds the set value, the voltage detection circuit 52 turns on the transistor (51) and thereby connects the dummy load 40 to the secondary DC power supply 30. Consequently, the apparent load (100) increases, so that the oscillation frequency is reduced and the secondary DC power supply voltage V2 can be stabilized.

As described above, there is provided the light load stabilization circuit 50 which comprises the switch circuit 51 and the voltage detection circuit 52. And, when the load 100 becomes small, the oscillation frequency becomes high, and it becomes difficult to stabilize the control, the dummy load 40 is connected, otherwise, the dummy load 40 is separated. Accordingly, even when the load 100 has a wide range of variation (from the maximum to the minimum), it is possible to stabilize secondary DC power supply voltage V2, save power, and maintain a predetermined power efficiency.

Also, the voltage detection circuit 52 comprises a zener diode ZD and voltage dividing resistors R1 and R2. Therefore, it is easy to select of the set voltage etc., coverage of the unit is wide, and it is easy to handle the unit.

Next, a patent document 2 (Japanese Utility Model Application Laid-Open No. 5-80185) is described below as a conventional example 2. This conventional example 2 relates to a power supply circuit which can achieve a stable power supply even against an input voltage having a wide range. FIG. 7 is a view showing an example of the power supply circuit.

As shown in FIG. 7, a control circuit 8 varies the period of a voltage applied to the base of a switching transistor 9 according to a variation of a load connected between output terminals A and B positioned in the secondary side of a power supply transformer 7. By this action, an amount of current per unit time flowing through the primary side of the transformer is controlled to keep constant the voltage between A and B.

A variation of the load between the output terminals A and B is detected by voltage dividing resistors 10 and 11, a shunt regulator 12, a resistor 13 and a photodiode 14, all provided in the secondary side, and a photo transistor 15 provided in the primary side. Specifically, a variation of voltage between A and B corresponding to the above load variation is detected by the shunt regulator 12. And then, the amount of variation is transmitted to the primary side via the photodiode 14 and the photo transistor 15. By this action, the amount of current flowing through the primary coil is controlled so as to eliminate the variation of voltage between the above terminals, and then the voltage between A and B is kept at a constant value at all times.

Referring to FIG. 7, reference numerals 16 and 17 denote a diode and a smoothing capacitor, respectively, for converting a squire-wave voltage induced in the secondary coil into a direct current. Reference numerals 18 and 19 denote a rectifier and a smoothing capacitor, respectively, for converting an alternating voltage applied from an alternating power source 20 via a filter 21 into a direct current. Reference numeral 22 denotes a snubber circuit for suppressing squire-wave current noises applied to the primary coil.

By this structure, a DC voltage proportional to an input voltage is produced by a rectifier diode 5 and a rectifier capacitor 6, and current flowing through a dummy resistor 1 is controlled by a transistor 2. The amount of current flowing through the dummy resistor 1 becomes larger when the voltage applied to the base of the transistor 2 becomes lower, or when the input voltage becomes higher. This is equal with the addition of a larger load. A resistor 3 and a constant-voltage diode 4 are used to adjust the current flowing through the dummy resistor 1.

As described above, according to the conventional example 2, when the input voltage is high, a large dummy load is added, and when the input voltage is low, a small dummy load is added. Consequently, a dummy load corresponding to the input voltage is added to prevent intermittent oscillation, and further a load is not uselessly added.

In the conventional example 1, however, when the output voltage becomes high and exceeds a predetermined set voltage (a voltage detected by a zener diode), a current is flowed through the dummy load. Accordingly, variation of the output voltage due to the load variation is considerably large. Also, since the output voltage is detected by the zener diode, variation of the detecting point is large. Also, since there is no hysteresis in at a time of switching of the dummy load, chattering often occurs in the operation.

Further, in a switching power supply unit using RCC, according to the basic operation of RCC, when the load becomes light, the oscillation frequency becomes high and at the same time the on-period becomes short, so that it becomes impossible for the main switching element to secure the on-period. Accordingly, intermittent oscillation occurs. As a result, the output ripple voltage often becomes significantly large or the output voltage often rises.

In the conventional example 2, the dummy load is connected at all times, and the amount of load is controlled according to the magnitude of the input voltage. Accordingly, power loss is large, and a large size transistor is required.

SUMMARY OF THE INVENTION

To solve the above problem of conventional art, it is an object of the present invention to prevent intermittent oscillation and the increase of output ripple voltage in a state of a light load, minimize useless power consumption, and improve the variation rate of the output voltage by connecting a dummy load circuit only in the state of the light load.

A switching power supply unit of the present invention comprises an input terminal, an output terminal, a transformer provided between the input terminal and the output terminal and having a primary coil and a secondary coil, a primary side circuit connected to the primary coil of the transformer, and a secondary side circuit connected to the secondary coil of the transformer. The primary side circuit comprises a main switching element driving the primary coil of the transformer, and a control circuit driving and controlling the main switching element so as to keep constant an output voltage of the output terminal by detecting the output voltage of the output terminal to feedback and acquiring a voltage induced in the transformer. The secondary side circuit comprises a dummy load circuit connected to the output terminal, a detection circuit detecting a secondary coil voltage of the transformer, and a dummy load control circuit being controlled by the detection circuit, and controlling so as to flow current through the dummy load circuit only in a state of a light load.

Preferably, in the switching power supply unit, the detection circuit further comprises a time-constant circuit having a resistor and a capacitor, and a first switch element being controlled by the time-constant circuit. The first switch element is turned off in the state of the light load and being turned on in a state of an ordinary load except for the state of the light load. The dummy load control circuit comprises a capacitor which is charged when the first switch element of the detection circuit is in the on state, a second switch element turned on or off according to the charged voltage of the capacitor, and a third switch element turned on or off by the second switch element. In the state of the light load, the dummy load circuit turns on to flow current according to turning on the third switch element by turning off the second switch element and the first switch element. And, in the state of the ordinary load, the dummy load circuit turns off not to flow current according to turning off the third switch element by turning on the second switch element and the first switch element. Thus, current flows through the dummy load circuit only in the state of the light load.

Preferably, in the switching power supply unit, the secondary side circuit further comprises a hysteresis circuit provided between the detection circuit and the dummy load control circuit, and making the detection circuit and the dummy load control circuit perform hysteresis operation at times of turning on or off the dummy load circuit. And, an input voltage of the first switch element is changed in first state in which the first switch element is in the off state and the second switch element is in the off state, and second state in which the first switch element is in the on state and the second switch element is in the on state. Thus the hysteresis operation is performed at the times of turning on or off the dummy load circuit.

BRIEF DESCRIPTION OF THE DRAWINGS

FIGS. 3A to 3F are waveform charts of each part according to the embodiment.

DETAILED DESCRIPTION OF THE PREFERRED EMBODIMENTS

Figure 1:
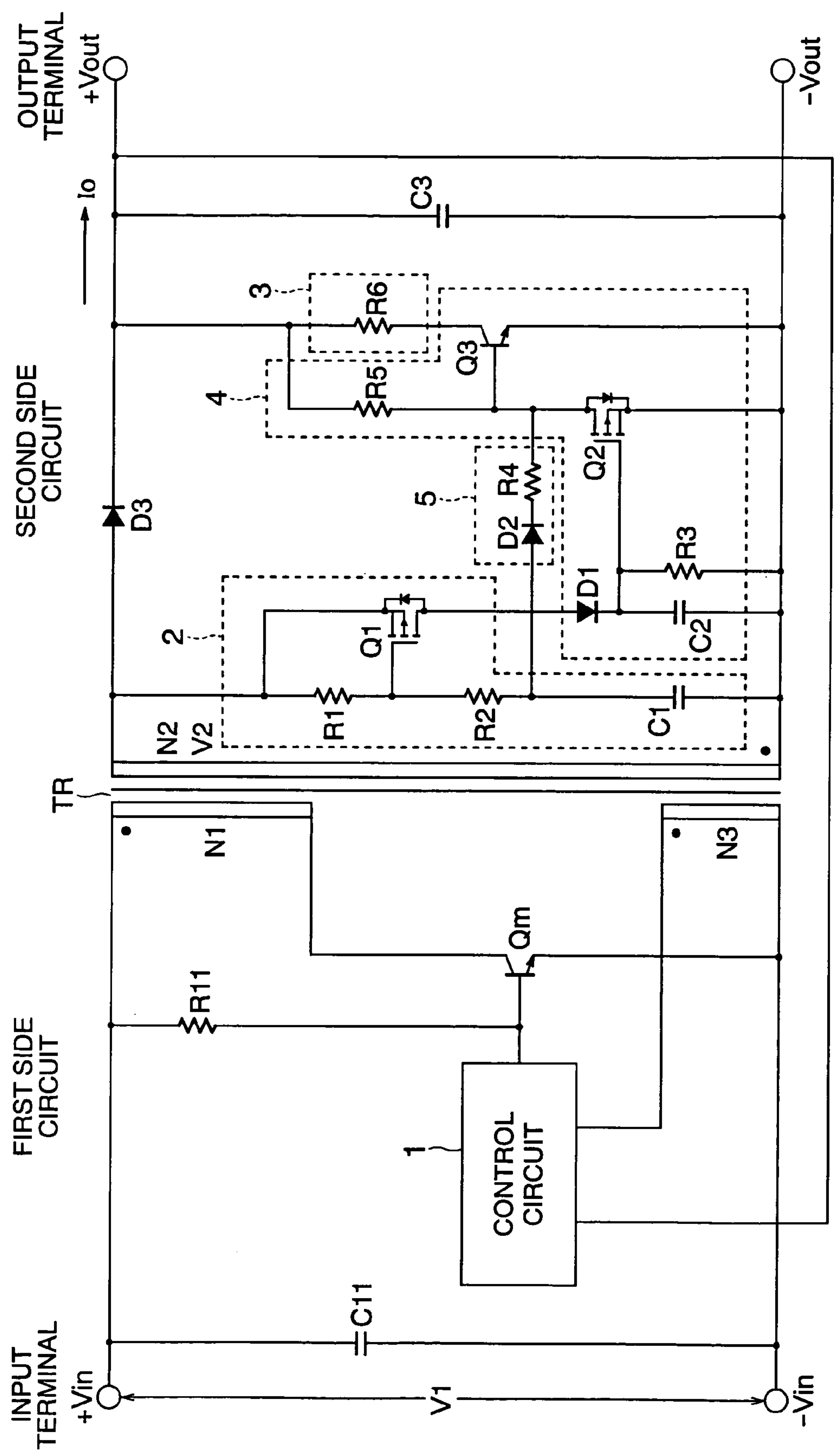
FIG. 1 is a view showing an exemplary circuit of a switching power supply unit according to an embodiment of the present invention.

FIG. 1 is a view showing an exemplary circuit of a switching power supply unit. An operation according to the feature of the present invention is described below with reference to FIG. 1.

When input voltage V1 is applied, a control circuit 1 starts to drive and control a main switching element Qm so that an output voltage is a constant voltage. Under this drive and control, the main switching element Qm repeats its on or off operation, and voltage (secondary coil voltage) V2 is induced in a secondary coil N2 of a transformer TR. The secondary coil voltage V2 is detected by a detection circuit 2. In this case, when the secondary coil voltage V2 is induced in the secondary coil N2 of the transformer TR, a capacitor C1 is charged via resistors R1 and R2.

In a state of an ordinary load, a MOSFETQ1 is turned on. However, in a state of a light load, a value of load current (output current) Io is small, so that the MOSFETQ1 is not turned on. The detection circuit 2 converts the secondary coil voltage V2 to a DC voltage, and indirectly detects the load current (the output current) Io by determining the magnitude of the DC voltage, based on a fact that the oscillation waveform varies between in the state of the ordinary load and in the state of the light load.

In this case, in the state of the light load, a slope of the secondary coil voltage waveform is gradual, and thus the MOSFETQ1 is not turned on (in the off state). However, in the state of the ordinary load, the slope of the secondary coil voltage waveform of the transformer TR is steep, thus the MOSFETQ1 is turned on. In the state of the light load, since the MOSFETQ1 is in the off state, a capacitor C2 is not charged and thus a MOSFETQ2 remains in the off state. At this time, a current from the output terminal flows between the base and emitter of a transistor Q3 via a resistor R5, so that the transistor Q3 becomes in the on state. Accordingly, a dummy load current flows through a dummy load resistor R6 of a dummy load circuit 3 (or the dummy load circuit 3 is turned or switched on).

On the other hand, in the state of the ordinary load, the MOSFETQ1 is turned on, and the voltage of the capacitor C2 rises, thus the MOSFETQ2 is turned on. Thus, the base voltage of the transistor Q3 is reduced, so that the transistor Q3 is turned off. Accordingly, a current is not allowed to flow through the dummy load resistor R6 of the dummy load circuit 3, so that the dummy load circuit 3 is changed to a non-conducting state.

Under the control by the dummy load control circuit 4, a dummy load current flows through the dummy load resistor R6 in the state of the light load. However, in the state of the ordinary load, a current is not allowed to flow through the dummy load resistor R6 of the dummy load circuit 3 (or the dummy load circuit 3 is turned or switched off), and thus the dummy load resistor R6 of the dummy load circuit 3 is separated from the output side.

Due to provision of a hysteresis circuit 5, in the state of the light load, output current Io is small, so the MOSFETQ1 is in the off state, the MOSFETQ2 is in the off state, and the transistor Q3 is in the on state. Thus, the dummy load current flows through the dummy load resistor R6. Hereafter, when the output current Io increases, the MOSFETQ1 is turned on, and the MOSFETQ2 is turned on. Then, a current flows through the hysteresis circuit 5 via the MOSFETQ2 which is in the on state. As a result, a gate voltage of the MOSFETQ1 is further deeply biased toward the negative side. Consequently, by virtue of the hysteresis circuit 5, chattering at the time of switching of the dummy load circuit 3 is prevented from occurring.

With the operation described above, intermittent oscillation and the increase of the output ripple voltage in the state of the light load are prevented, and useless power consumption is minimized, and, in addition, the variation rate of the output voltage can be improved by connecting the dummy load circuit 3 to the output terminal as a dummy load, only in the state of the light load.

According to the present invention, it is possible to detect the state of the light load by indirectly detecting the load current (the output current) from the second coil voltage waveform of the transformer, and to connect the dummy load circuit 3 to the output terminal only when the state of the light load is detected by changing the dummy load circuit 3 to a conducting state. Accordingly, the variation of the output voltage is reduced. Also, power loss is reduced since the dummy load is separated when the load current is large.

Also, according to the present invention, due to provision of a hysteresis circuit, chattering is eliminated from the operation at the time of switching on or off the dummy load circuit 3, thus reducing the variation of output voltage.

Further, according to the present invention, it is possible to prevent the intermittent oscillation from occurring and the output ripple voltage increasing in the state of the light load, and to minimize the useless power consumption, and the variation rate of the output voltage can be improved by connecting the dummy load circuit 3 in the state of the light load.

(Explanation of a Circuit Structure of the Switching Power Supply Unit)

Figure 2:
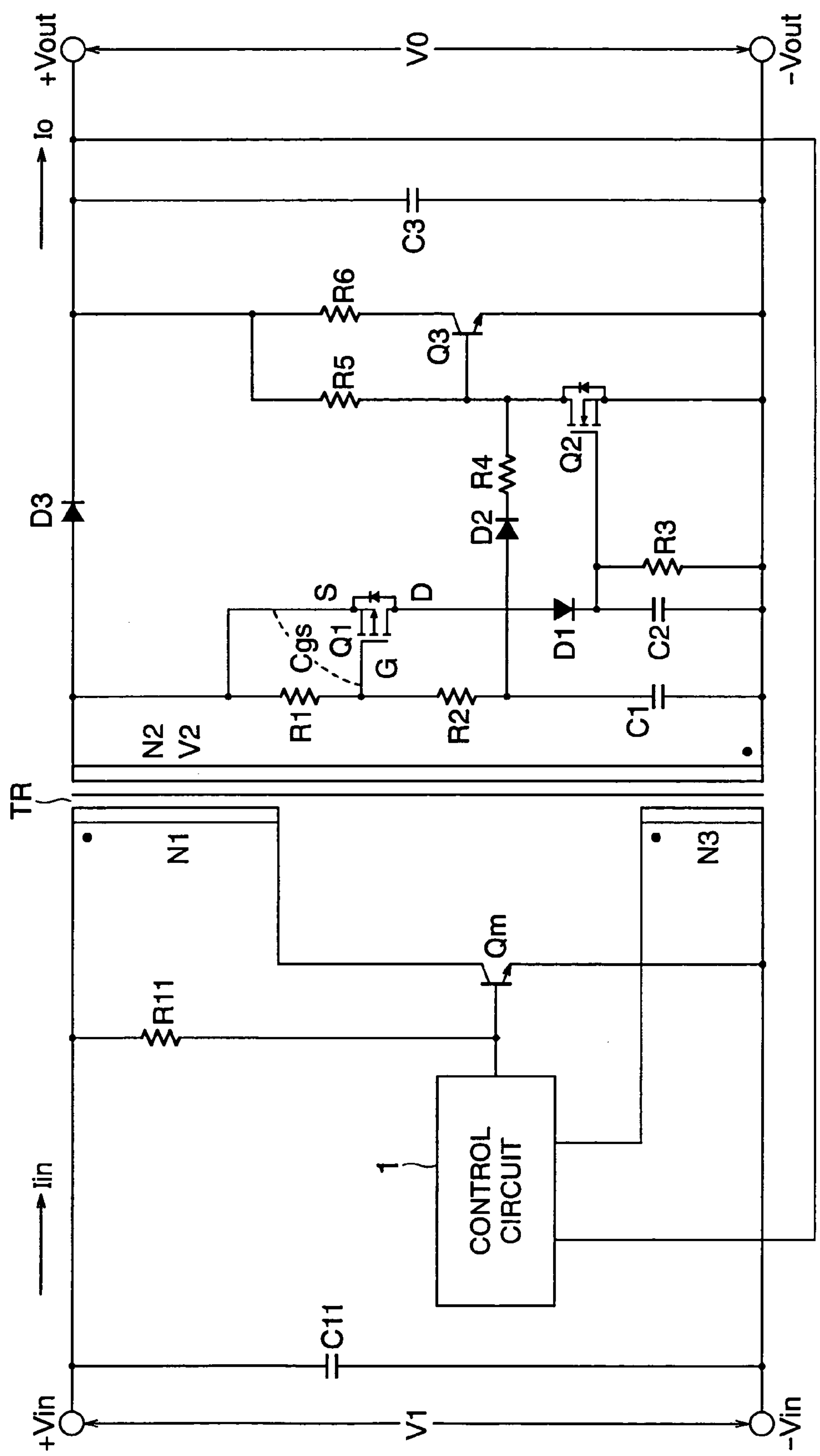
FIG. 2 is a detailed explanatory diagram of the circuit of the switching power supply unit according to the embodiment.

FIG. 2 is a detailed explanatory diagram of the circuit of the switching power supply unit. The circuit structure of the switching power supply unit is described below with reference to FIGS. 1 and 2.

As shown in FIG. 1, the switching power supply unit includes a transformer TR provided between an input terminal (a pair of input terminal) and an output terminal (a pair of output terminal), a primary side circuit connected to a primary coil of the transformer, and a secondary side circuit connected to a secondary coil of the transformer.

The primary side circuit includes, a smoothing capacitor C11 connected between the input terminals, a main switching element (a bipolar transistor, for example) Qm, a control circuit 1 which drives and controls the main switching element Qm so as to keep constant an output voltage (a load voltage) of the output terminal, and a resistor R11 etc. The resistor R11 is connected between the input terminal and the control circuit 1 or an input terminal (the base of a transistor, for example) of the main switching element Qm.

In this case, the transformer TR is provided with the primary coil N1, the secondary coil N2 and the tertiary coil N3. And, a terminal (the collector in this example) of the main switching element Qm is connected to one terminal of the primary coil N1. One terminal of the tertiary coil N3 is connected to the control circuit 1. The output voltage (voltage of the output terminal) of the switching power supply unit is feedbacked to the control circuit 1 to perform a constant-voltage control.

The secondary side circuit of the transformer TR includes a detection circuit 2 which is connected to the secondary coil N2 of the transformer TR and detects secondary coil voltage V2 generated in the secondary coil N2, a dummy load circuit 3, a dummy load control circuit 4 which controls the dummy load circuit 3, a hysteresis circuit 5 for performing an hysteresis operation at the time of switching of the dummy load circuit 3, a rectifier diode D3, and an output-side smoothing capacitor C3, etc.

The detection circuit 2 includes a time-constant circuit and the p-channel MOSFETQ1 (hereafter, "MOSFETQ1" for short). The time-constant circuit has a series circuit which comprises resistors R1 and R2 connected between both terminals of the secondary coil N2 of the transformer TR, and a capacitor C1. Referring to FIG. 2, reference character G, S and D represent the gate, source and drain of the MOSFETQ1, respectively.

The dummy load circuit 3 comprises a dummy load resistor R6. The dummy load control circuit 4 includes a diode D1, a capacitor C2, a resistor R3, the n-channel MOSFETQ2 (hereafter, "MOSFETQ2" for short), a resistor R5, a bipolar transistor Q3 (hereafter, "transistor Q3" for short), etc. The hysteresis circuit 5 is a series circuit comprising a diode D2 and a resistor R4.

A slope of waveform (described later) of the secondary coil voltage V2 induced in the secondary coil N2 of the transformer TR varies according to load current (output current) Io flowing through the output terminal. Accordingly, the detection circuit 2 converts the load current (the output current) Io to a DC voltage corresponding to the slope of the waveform to indirectly detect the load current (the output current) Io.

The time-constant circuit of the detection circuit 2 has a CR time constant preliminarily set to an appropriate value. As a result of this, the MOSFETQ1 is not turned on when the waveform of the secondary coil voltage of the transformer TR has a gradual slope, and the MOSFETQ1 is turned on when the voltage waveform has a steep slope.

(Outline of Operation of the Switching Power Supply Unit)

An outline of operation of the switching power supply unit shown in FIGS. 1 and 2 is described below.

When input voltage V1 (DC voltage) is applied to the input terminal, a voltage smoothed by the capacitor C11 is generated. At this time, the control circuit 1 starts to drive and control the main switching element Qm so as to keep constant the output voltage. Under this drive and control, the main switching element Qm repeats its on or off operation, so that a current flows through the primary coil N1 of the transformer TR, and a voltage is induced in the secondary coil N2 and the tertiary coil N3.

In this case, the control circuit 1 receives the induced voltage of the tertiary coil N3 of the transformer TR, and at the same time, acquires output voltage Vo by feedback to drive and control the main switching element Qm, whereby a control is performed to keep constant the output voltage.

The detection circuit 2 detects the secondary coil voltage V2 induced in the secondary coil N2 of the transformer TR. At this time, the capacitor C1 is charged via the resistors R1 and R2.

In the charge process, stray capacitance Cgs (hereinafter referred to as "capacitance Cgs") between the gate and source of the MOSFETQ1 is charged. The MOSFETQ1 is turned on by the charged voltage of the capacitance Cgs, or remains in the off state (described later in detail). Then, when the polarity of the secondary coil voltage is inverted, the capacitor C1 is discharged, and is again charged in the subsequent cycle. This operation is repeated.

In association with the above described operation, the capacitance Cgs of the MOSFETQ1 is repeatedly charged and discharged. However, in the state of the light load, a value of the load current (the output current) Io is small and thus the charged voltage of the capacitance Cgs does not reach a threshold value for turning on the MOSFETQ1, so that the MOSFETQ1 is not turned on (remains in the off state). This is a definition for the light load. On the contrary, in the state of the ordinary load except for the state of the light load (a state in which a larger load current flows compared to that in the state of the light load), the charged voltage of the capacitance Cgs exceeds the threshold value and thus the MOSFETQ1 is turned on.

Since the MOSFETQ1 is in the off state in the state of the light load, the capacitor C2 is not charged, and thus the MOSFETQ2 remains in the off state. At this time, a current from the output terminal flows between the base and emitter of the transistor Q3 via the resistor R5. As a result, the transistor Q3 is turned on, whereby current (dummy load current) flows through the dummy load resistor R6 of the dummy load circuit 3.

On the other hand, in the state of the ordinary load, the MOSFETQ1 is turned on, and thus the capacitor C2 is charged via the diode D1. When the charged voltage of the capacitor C2 reaches a predetermined value, the MOSFETQ2 is turned on. Accordingly, the transistor Q3 is turned off, and thus the current flowing through the dummy resistor R6 of the dummy load circuit 3 stops, whereby the dummy resistor R6 of the dummy load circuit 3 becomes the off state.

The hysteresis circuit 5 performs a hysteresis operation when the dummy load circuit 3 is inserted or removed on the output side, to stabilize circuit state at the time of switching of the dummy load circuit 3 (or to eliminate chattering). More specifically, the gate voltage of the MOSFETQ1 is varied between a state in which both of the MOSFETQ1 and MOSFETQ2 are in the off state, and a state in which both of the MOSFETQ1 and MOSFETQ2 are in off state (when the MOSFETQ2 is turned on, the gate voltage is further lowered). As a result, a hysteresis operation is performed at the time of switching on or off the dummy load circuit 3.

As described above, the dummy load circuit 3 is inserted in the output terminal only in the state of the light load, and is separated from the output terminal in the state of the ordinary load except for the state of the light load.

(Detailed Operation of the Switching Power Supply Unit)

Figure 4:
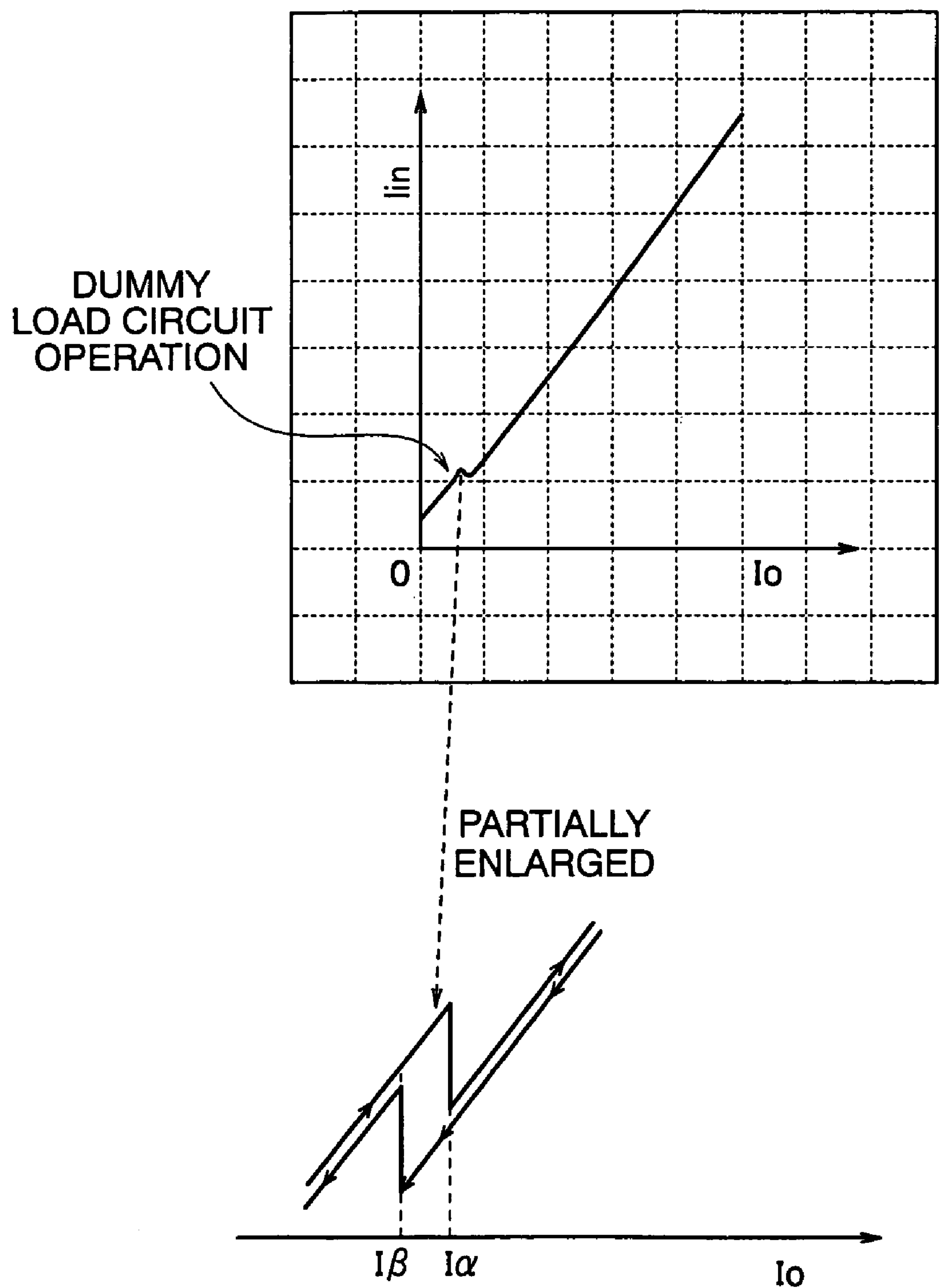
FIG. 4 is a characteristic chart of a hysteresis operation according to the embodiment.
Figure 5A:
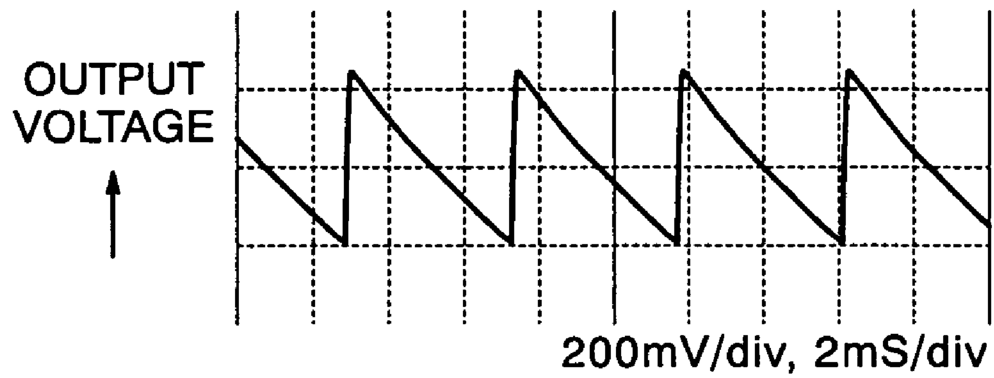
FIGS. 5A and 5B are waveform charts of output ripple voltage according to the embodiment.
Figure 5B:
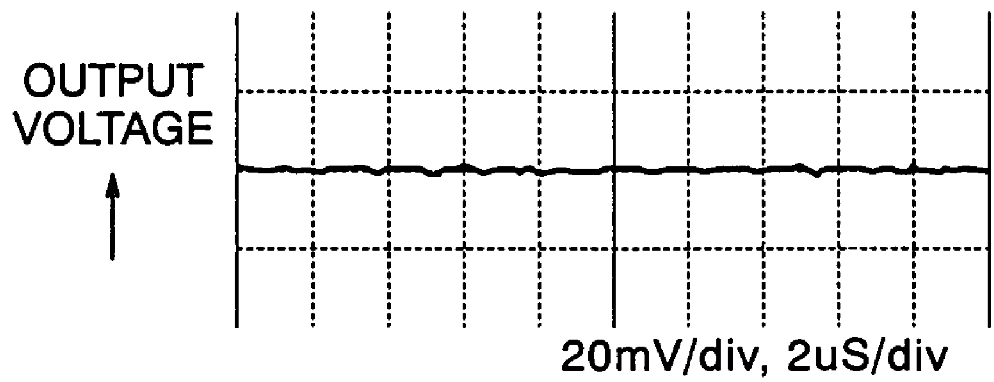
Figure 6:
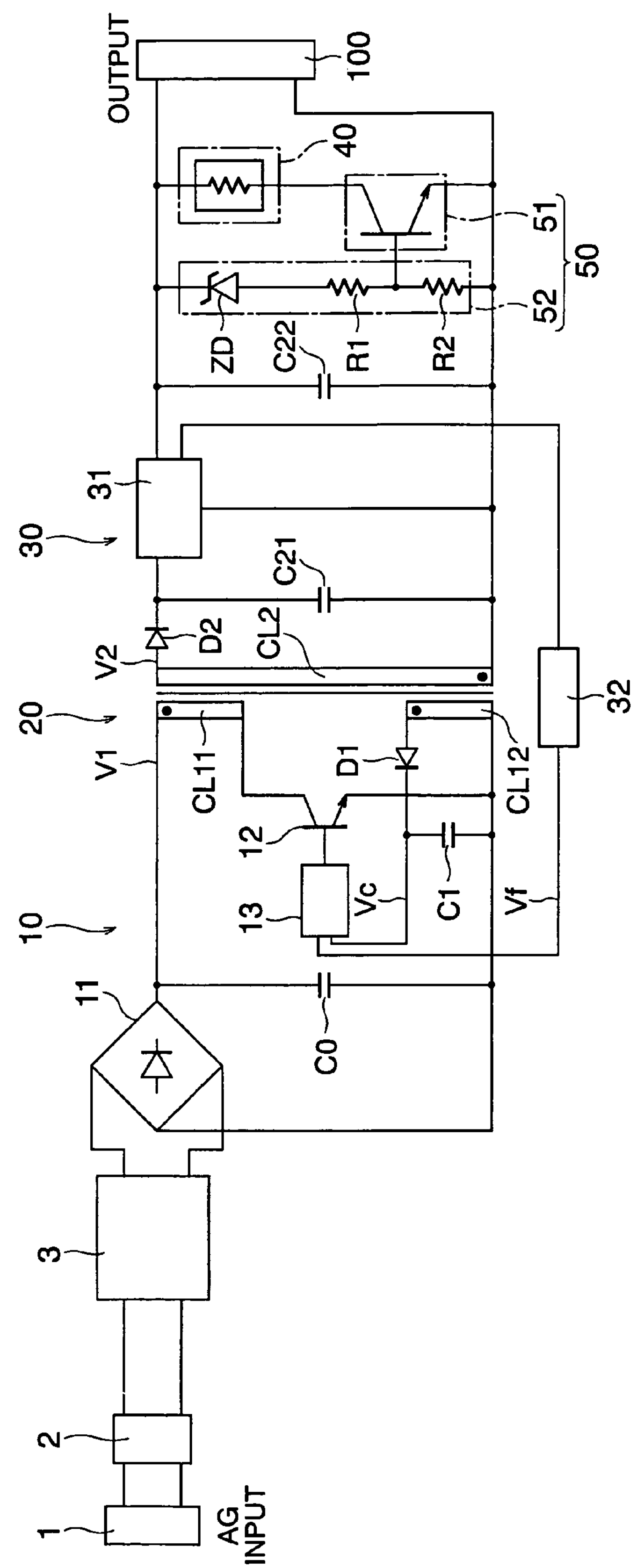
FIG. 6 is an explanatory diagram of the conventional example 1.
Figure 7:
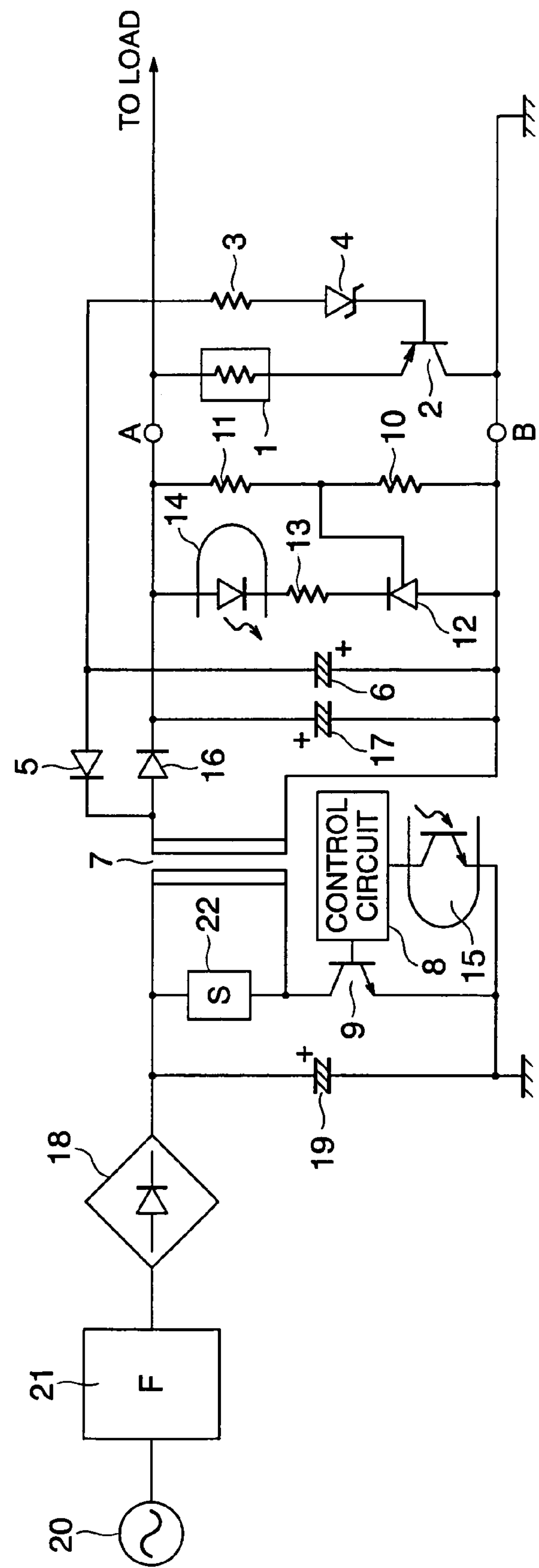
FIG. 7 is an explanatory diagram of the conventional example 2.

FIGS. 3A to 3F are waveform charts of each part. FIG. 4 is a characteristic chart of the load current versus input current. FIGS. 5A and 5B are waveform charts of the output ripple voltage. Based on FIGS. 3A to 5B, the operation of the switching power supply unit is described below in detail with reference to FIGS. 1 and 2.

Firstly the operation of the primary side circuit of the transformer TR is described below.

When the input voltage V1 is applied to the input terminal, the main switching element Qm is driven by the drive and control of the control circuit 1 to be turned on or off. When the main switching element Qm is turned on, a current flows through the primary coil N1 of the transformer TR, and a voltage is induced in the secondary coil N2 and the tertiary coil N3. Hereafter, when the induced voltage of the tertiary coil N3 decreases, the main switching element Qm is turned off by the control circuit 1. In this way, a rectangular wave voltage is applied to the primary coil N1 by the main switching element Qm.

Specifically, the control circuit 1 receives the induced voltage of the tertiary coil N3 of the transformer TR, and at the same time, acquires the feedbacked output voltage Vo to drive and control the main switching element Qm. By this operation, the main switching element Qm is repeatedly turned on or off, and thus a rectangular wave voltage is applied to the primary coil N1 of the transformer TR, and at the same time, the secondary coil voltage V2 is induced in the secondary coil N2 of the transformer TR.

The operation of the detection circuit 2 is now described below.

As described above, when the secondary coil voltage V2 is induced in the secondary coil N2 of the transformer TR, the detection circuit 2 detects the secondary coil voltage V2. In this case, when the secondary coil voltage V2 is induced in the secondary coil N2 of the transformer TR, the capacitor C1 is charged via the resistors R1 and R2. At this time, a current flows via the capacitance Cgs of the MOSFETQ1, whereby the capacitance Cgs is repeatedly charged and discharged.

In the state of the light load, the value of the load current (the output current) Io becomes small and thus the charged voltage of the capacitance Cgs does not reach the threshold value of voltage between the gate and source of the MOSFETQ1, so that the MOSFETQ1 is not turned on (remains in the off state). However, in the state of the ordinary load except for the state of the light load, the charged voltage of the capacitance Cgs exceeds the threshold value of voltage between the gate and source of the MOSFETQ1, so that the MOSFETQ1 is turned on. The operations in the state of the ordinary load and of the light load are described below with reference to FIGS. 3A to 3F.

FIG. 3A (secondary coil voltage waveform of the transformer), FIG. 3B (Vgs waveform of Q1) and FIG. 3C (Vgs waveform of Q2) each show waveform charts when the load current (the output current) Io=0% (corresponding to the state of the light load). FIG. 3D (secondary coil voltage waveform of the transformer), FIG. 3E (Vgs waveform of Q1) and FIG. 3F (Vgs waveform of Q2) each show waveform charts when the load current (the output current) Io=50% (corresponding to the state of the ordinary load).

FIGS. 3A and 3D show the secondary coil voltage waveforms of the transformer. FIGS. 3B and 3E show Vgs (voltage between the gate and source) waveforms of the MOSFETQ1. FIGS. 3C and 3F show Vgs (voltage between the gate and source) waveforms of the MOSFETQ2. "Vth" of FIGS. 3B and 3E denotes a threshold value (a threshold value between the on or off states) of Vgs (voltage between the gate and source) of the MOSFETQ1.

As shown in FIGS. 3A and 3D, the voltage V2 waveform of the secondary coil N2 of the transformer TR has a different inclination according to the load current Io. Specifically, while the secondary coil voltage waveform shown in FIG. 3A has a gradual inclination (rise time tr≈300 nS), the secondary coil voltage waveform shown in FIG. 3D has a steep inclination (rise time tr≈100 nS). The inclinations of waveform shown in each drawing are different from each other.

The detection circuit 2 converts the secondary coil voltage V2 of the transformer TR to a DC current corresponding to its waveform inclination (corresponding to its slope) to indirectly detect the load current (the output current) Io.

The value of CR time constant of the time constant circuit comprising the resistors R1 and R2, and the capacitor C1 is appropriately selected in the detection circuit 2. Due to this structure, when the slope is gradual (refer to FIG. 3A), the voltage between the gate and source Vgs of the MOSFETQ1 does not reach the threshold value Vth (refer to FIG. 3B), and thus the MOSFETQ1 is not turned on (in the off state). However, when the slope is steep (refer to FIGS. 3D and 3E), the voltage between the gate and source Vgs of the MOSFETQ1 exceeds the threshold value Vth, and thus the MOSFETQ1 is turned on.

The operation of the dummy load control circuit 4 is described below.

As described above, when the MOSFETQ1 is in the off state in the state of the light load, the capacitor C2 is not charged, and thus the MOSFETQ2 remains in the off state (refer to FIG. 3C). At this time, a current from the output terminal flows between the base and emitter of the transistor Q3 via the resistor R5, and thus the transistor Q3 is turned on, whereby the dummy load current flows through the dummy load resistor R6.

On the other hand, in the state of the ordinary load, the MOSFETQ1 is turned on, and thus the capacitor C2 starts to be charged via the diode D1. When the voltage of the capacitor C2 rises gradually and thus the voltage between the gate and source Vgs of the MOSFETQ2 reaches the threshold value (refer to FIGS. 3E and 3F), the MOSFETQ2 is turned on. Accordingly, the base voltage of the transistor Q3 is reduced, and thus the transistor Q3 is turned off. As a result, a current is not allowed to flow through the dummy load resistor R6 of the dummy load circuit 3, and the dummy load resistor R6 of the dummy load circuit 3 is separated from the output side.

In this way, under the control by the dummy load control circuit 4, the dummy load current flows through the dummy load resistor R6 in the state of the light load. However, in the state of the ordinary load, the current is not allowed to flow through the dummy load resistor R6 of the dummy load circuit 3, and thus the dummy load resistor R6 of the dummy load circuit 3 is separated from the output side.

The operation of the hysteresis circuit is now described.

FIG. 4 is a characteristic chart of the hysteresis operation. Based on FIG. 4, the operation of the hysteresis circuit is described below with reference to FIGS. 1 and 2.

Referring to FIG. 4, the load current (the output current) is plotted along the horizontal axis and input current Iin along the vertical axis. As shown in FIG. 4, the dummy load current flows through the dummy load resistor R6 in the state of the light load. Accordingly, the input current Iin remains large in the state of the light load. When the load current Io increases gradually from this state and reaches a predetermined value, the dummy load resistor R6 is separated from the output side.

At this time, the dummy load current flowing through the dummy load resistor R6 stops, and thus the input current Iin decreases temporarily. Specifically, while the dummy load resistor R6 operates in the state of the light load, the input current Iin remains large. However, in a transition from the state of the light load to the state of the ordinary load, the dummy load resistor R6 is separated from the output side.

In this state, the input current Iin decreases temporarily, and thereafter as the output current Io increases, the input current Iin also increases. To prevent chattering from being generated at the time of switching of the dummy load resistor R6, the hysteresis circuit 5, which comprises the diode D2 and resistor R4, operates. The hysteresis operation of the hysteresis circuit 5 is as follows.

In the state of the light load, the output current Io is small, so the MOSFETQ1 is in the off state, the MOSFETQ2 is in the off state, and the transistor Q3 is in the on state, and thus the dummy load current flows through the dummy load resistor R6. Thereafter, when the output current Io increases, the MOSFETQ1 is turned on, and the MOSFETQ2 is turned on, then a current flows through the hysteresis circuit 5 via the MOSFETQ2 being in the on state, whereby the gate voltage of the MOSFETQ1 is further deeply biased toward the negative side.

Accordingly, when the output current Io decreases again thereafter, a hysteresis operation is performed. Specifically, when the output current Io increases gradually from a small value and reaches a first predetermined current $I\alpha$, the MOSFETQ1 is turned on and the MOSFETQ2 is turned on. Also, when the output current Io decreases gradually from a large value and reaches a second predetermined current $I\beta$, the MOSFETQ1 is turned off and the MOSFETQ2 is turned off. However, since $I\beta < I\alpha$, chattering is prevented from being generated at the time of switching of the dummy load resistor.

The waveform of output ripple voltage is now described below.

FIGS. 5A and 5B are waveform charts of the output ripple voltage. FIG. 5A shows a state in which the dummy load resistor is not connected, the output current Io=0%, and the intermittent oscillation takes place. The waveform of the output voltage (the output ripple voltage) is plotted along the vertical axis (AC representation). It can be seen from FIG. 5A that the repeating period of the output ripple voltage waveform in this state is larger than the oscillating period.

FIG. 5B shows a state in which the dummy load resistor is connected, the load current (output current) Io=0%, and the state of the ordinary load takes place. The waveform of the output ripple voltage is plotted along the vertical axis (AC representation). The output voltage waveform in this state is approximately equal to the GND level.

As described above, when the dummy load resistor R6 is not connected in the state of the light load or the state of Io=0, the intermittent oscillation state shown in FIG. 5A takes place, and thus the output voltage becomes unstable. In view of this, as described above, when a current is flowed through the dummy load resistor R6 of the dummy load circuit 3 only in the state of the light load, the output voltage does not contain ripples, and thus the output voltage becomes stable, as shown in FIG. 5B.

The previous description is of a preferred embodiment of a switching power supply unit using RCC (Ringing Choke Converter). However, the present invention is not limited to such embodiment and similarly to the description described above. The present invention is also applicable to, for example, a switching power supply unit such as a PWM control type fly-back converter or a forward converter.

What is claimed is:

1. A switching power supply unit, comprising:

an input terminal;

an output terminal;

a transformer provided between the input terminal and the output terminal, said transformer comprising a primary coil and a secondary coil;

a primary side circuit connected to the primary coil of the transformer, said primary side circuit comprising:

a main switching element driving the primary coil of the transformer; and a control circuit driving and controlling the main switching element to keep constant an output voltage of said output terminal by detecting the output voltage of said output terminal to feedback and acquiring a voltage induced in said transformer; and a secondary side circuit connected to the secondary coil of said transformer, said secondary side circuit comprising:

a dummy load circuit connected to the output terminal;

a detection circuit detecting a secondary coil voltage of the transformer, said detection circuit comprising a time-constant circuit having a resistor and a capacitor, and a first switch element being controlled by said time-constant circuit, said first switch element being turned off in a state of light load and being turned on in a state of an ordinary load except for the state of the light load; and a dummy load control circuit being controlled by said detection circuit, and controlling flow of current through said dummy load circuit only in a state of a light load, said dummy load control circuit comprising a capacitor charged when said first switch element of said detection circuit is in the on state, a second switch element turned on or off according to the charged voltage of the capacitor, and a third switch element turned on or off by said second switch element, said dummy load circuit turning on to flow current during the state of light load when the third switch element is turned on by turning off the second switch element and the first switch element, said dummy load circuit turning off flow of current in the state of ordinary load when the third switch element is turned off by turning on the second switch element and the first switch element, so that current flows through the dummy load circuit only in the state of the light load.

2. The switching power supply unit according to claim 1, wherein said secondary side circuit further comprises a hysteresis circuit provided between said detection circuit and said dummy load control circuit, and making said detection circuit and said dummy load control circuit perform hysteresis operation at times of turning on or off said dummy load circuit, and wherein an input voltage of said first switch element is changed in first state in which said first switch element is in the off state and said second switch element is in the off state, and second state in which said first switch element is in the on state and said second switch element is in the on state, whereby the hysteresis operation is performed at the times of turning on or off said dummy load circuit.

3. A switching power supply unit, comprising:

an input terminal;

an output terminal;

a transformer provided between the input terminal and the output terminal, said transformer comprising a primary coil and a secondary coil;

a primary side circuit connected to said primary coil of said transformer, said primary side circuit comprising a main switching element for providing current flow through said primary coil of said transformer and a control means for driving and controlling said main switching element such that a constant output voltage is maintained;

a secondary side circuit connected to said secondary coil of said transformer, said secondary side circuit comprising:

a dummy load circuit connected to said output terminal;

a detection circuit for detecting a secondary coil voltage generated in said secondary coil of said transformer; and a dummy load control circuit controlled by said detection circuit, said dummy load control circuit comprising a capacitor and a second switch and a third switch.

4. The switching power supply unit according to claim 1, wherein said secondary side circuit further comprises a hysteresis circuit provided between the detection circuit and the dummy load control circuit, and making the detection circuit and the dummy load control circuit perform hysteresis operation at times of turning on or off the dummy load circuit, and wherein an input voltage of the first switch element is changed in first state in which the first switch element is in the off state and the second switch element is in the off state, and second state in which the first switch element is in the on state and the second switch element is in the on state, whereby the hysteresis operation is performed at the times of turning on or off the dummy load circuit.

* * * * *